United States Patent
Kwon et al.

(10) Patent No.: US 9,282,320 B2
(45) Date of Patent: Mar. 8, 2016

(54) 3D IMAGE PROCESSING APPARATUS, IMPLEMENTATION METHOD THEREOF AND COMPUTER-READABLE STORAGE MEDIUM THEREOF

(75) Inventors: Oh-yun Kwon, Seoul (KR); Jae-cheol Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 651 days.

(21) Appl. No.: 13/548,743

(22) Filed: Jul. 13, 2012

(65) Prior Publication Data

US 2013/0016096 A1    Jan. 17, 2013

(30) Foreign Application Priority Data

Jul. 13, 2011   (KR) .................. 10-2011-0069294

(51) Int. Cl.
   *H04N 13/02*   (2006.01)
(52) U.S. Cl.
   CPC .................................. *H04N 13/026* (2013.01)
(58) Field of Classification Search
   None
   See application file for complete search history.

(56) References Cited

U.S. PATENT DOCUMENTS

| | | | |
|---|---|---|---|
| 2003/0026474 A1* | 2/2003 | Yano | 382/154 |
| 2005/0012684 A1* | 1/2005 | Hewitt et al. | 345/8 |
| 2011/0115890 A1* | 5/2011 | Kim et al. | 348/56 |

FOREIGN PATENT DOCUMENTS

| | | |
|---|---|---|
| EP | 1617684 A1 | 1/2006 |
| WO | 2006/078249 A1 | 7/2006 |
| WO | 2007/148219 A2 | 12/2007 |
| WO | 2009/013682 A2 | 1/2009 |

OTHER PUBLICATIONS

Communication, dated Oct. 25, 2012, issued by the European Patent Office in counterpart European Patent Application No. 12161809.4.
Communication dated Sep. 18, 2015 issued by the European Patent Office in counterpart European Patent Application No. 12161809.4.

* cited by examiner

*Primary Examiner* — Said Broome
(74) *Attorney, Agent, or Firm* — Sughrue Mion, PLLC

(57) ABSTRACT

A three-dimensional (3D) image processing apparatus, an implementation method thereof and a computer-readable storage medium thereof are provided. The 3D image processing apparatus includes: an image processor which generates stereoscopic image processing information from an input image including a plurality of frames, and performs a rendering operation based on the generated stereoscopic image processing information to process the input image into a stereoscopic image; a controller which performs an error identification operation for a part of the plurality of frames having the stereoscopic image processing information; a display unit which displays the stereoscopic image processed by the image processor and error information on the part of the plurality of frames according to a result of the error identification operation performed by the controller.

20 Claims, 6 Drawing Sheets

3D IMAGE PROCESSING APPARATUS, IMPLEMENTATION METHOD THEREOF AND COMPUTER-READABLE STORAGE MEDIUM THEREOF

CROSS-REFERENCE TO RELATED APPLICATION

This application claims priority from Korean Patent Application No. 10-2011-0069294, filed on Jul. 13, 2011 in the Korean Intellectual Property Office, the disclosure of which is incorporated herein by reference.

BACKGROUND

1. Field

Apparatuses and methods consistent with the exemplary embodiments relate to a three dimensional (3D) image processing apparatus, an implementation method thereof and a computer-readable storage medium thereof, and more particularly, to a 3D image processing apparatus, an implementation method thereof and a computer-readable storage medium thereof which processes a 2D input image into a 3D image.

2. Description of the Related Art

A related image processing apparatus which processes a two-dimensional (2D) image having a plurality of frames into a 3D image, cannot identify existence of processing errors when the plurality of frames into the 3D image. Accordingly, error identification can only occur after the plurality of frames are processed into the 3D image. Not detecting errors before the plurality of frames are processed into the 3D image causes inconvenience.

Therefore, there is a need for identifying processing errors corresponding to part of the plurality of frames when the 2D image is processed into the 3D image.

SUMMARY

One or more exemplary embodiments provide a 3D image processing apparatus, an implementation method thereof and a computer-readable storage medium thereof which performs an error identification operation for a 3D image generated corresponding to a part of a plurality of frames of a 2D image and corrects error when the 2D image having the plurality of frames is processed into the 3D image.

According to an aspect of an exemplary embodiment, there is provided a three-dimensional (3D) image processing apparatus including: an image processor which generates stereoscopic image processing information from an input image including a plurality of frames, and performs a rendering operation based on the generated stereoscopic image processing information to process the input image into a stereoscopic image; a controller which performs an error identification operation for a part of the plurality of frames having the stereoscopic image processing information; and a display unit which displays the stereoscopic image processed by the image processor and error information for the part of the plurality of frames according to a result of the error identification operation performed by the controller.

The image processor may select a key frame among the plurality of frames, extract an object included in the selected key frame, assign depth information to the extracted object and track down a non-key frame among the plurality of frames to generate the stereoscopic image processing information.

The controller may determine an error in extracting the object based on a motion vector of the part of the plurality of frames for which the error identification operation is performed.

The controller may determine an error in assigning the depth information based on a depth map of the part of the plurality of frames for which the error identification operation is performed.

The controller may determine an error in selecting the key frame corresponding to the non-key frame based on an error occurrence frequency in extracting the object or assigning the depth information for the non-key frame.

The controller may display a predetermined area having an error on the part of the plurality of frames by using at least one of bold, highlight, and displaying a motion vector in a different color as the error information.

The 3D image processing apparatus may further include a user interface (UI) generator which generates a UI to correct an error, and the controller may control the UI generator to generate and display the generated UI on the part of the plurality of frames where the error is found.

The 3D image processing apparatus may further include a user input unit, and the controller may control the image processor to modify the stereoscopic image processing information based on a selection input through the UI and to perform a rendering operation for the input image based on the modified stereoscopic image processing information.

The 3D image processing apparatus may further include a user interface (UI) generator which generates a UI to display an error occurrence level, and the controller may determine an error occurrence level for the plurality of frames, and control the UI generator to generate and display the UI to display the determined level.

The controller may determine the error occurrence level based on a complexity of an object included in the plurality of frames or an amount of motion of the object.

The 3D image processing apparatus may further include a user input unit, and the controller may perform the error identification operation for the part of the plurality of frames having the stereoscopic image processing information until an input timing of an error identification mode which is selected through the user input unit.

According to an aspect of another exemplary embodiment, there is provided an implementation method of a three-dimensional (3D) image processing apparatus including: generating stereoscopic image processing information of an input image including a plurality of frames and performing a rendering operation based on the generated stereoscopic image processing information to process the input image into a stereoscopic image; performing an error identification operation for a part of the plurality of frames having the stereoscopic image processing information; and displaying the stereoscopic image and error information according to a result of the error identification operation.

Generating the stereoscopic image processing information may include selecting a key frame among the plurality of frames; extracting an object included in the selected key frame; assigning depth information to the extracted object; and performing a tracking operation for a non-key frame among the plurality of frames.

Performing the error identification operation may include determining an error in extracting the object based on a motion vector of the part of the plurality of frames for which the error identification operation is performed.

Performing the error identification operation may include determining an error in assigning the depth information based on a depth map of the part of the plurality of frames for which the error identification operation is performed.

Performing the error identification operation may include determining an error in selecting the key frame corresponding to the non-key frame based on an error occurrence frequency in extracting the object or assigning the depth information for the non-key frame.

Displaying the error information may include displaying a predetermined area having an error on the part of the plurality of frames by using at least one of bold, highlight, and displaying a motion vector in a different color as the error information.

The implementation method may further include generating and displaying a user interface (UI) on the part of the plurality of frames having an error.

The implementation method may further include modifying the stereoscopic image processing information based on a selection input through the UI; and rendering the input image based on the modified stereoscopic image processing information.

The implementation method may further include determining an error occurrence level for the plurality of frames; and generating and displaying a UI to display the determined error occurrence level.

Determining may include determining the error occurrence level based on a complexity of an object included in the plurality of frames or an amount of motion of the object.

Performing the error identification operation may include performing the error identification operation for the part of the plurality of frames having the stereoscopic image processing information until an input timing of an error identification mode.

A non-transitory computer readable medium which records a program, which when executed, performs the method of the 3D image processing apparatus.

According to an aspect of another exemplary embodiment, there is provided a 3D image processing apparatus including: a receiver which receives an input image comprising a plurality of frames; a user input unit which receives a user input; a user interface (UI) generator which generates a UI; an image processor which receives the input image from the receiver and generates stereoscopic image processing information from the input image comprising the plurality of frames, and performs a rendering operation based on the generated stereoscopic image processing information to process the input image into a stereoscopic image; a controller which receives the user input from the user input unit and performs an error identification operation for a part of the plurality of frames having the stereoscopic image processing information; and a display unit which displays the stereoscopic image processed by the image processor and error information for the part of the plurality of frames according to the error identification operation performed by the controller.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

Figure 1:
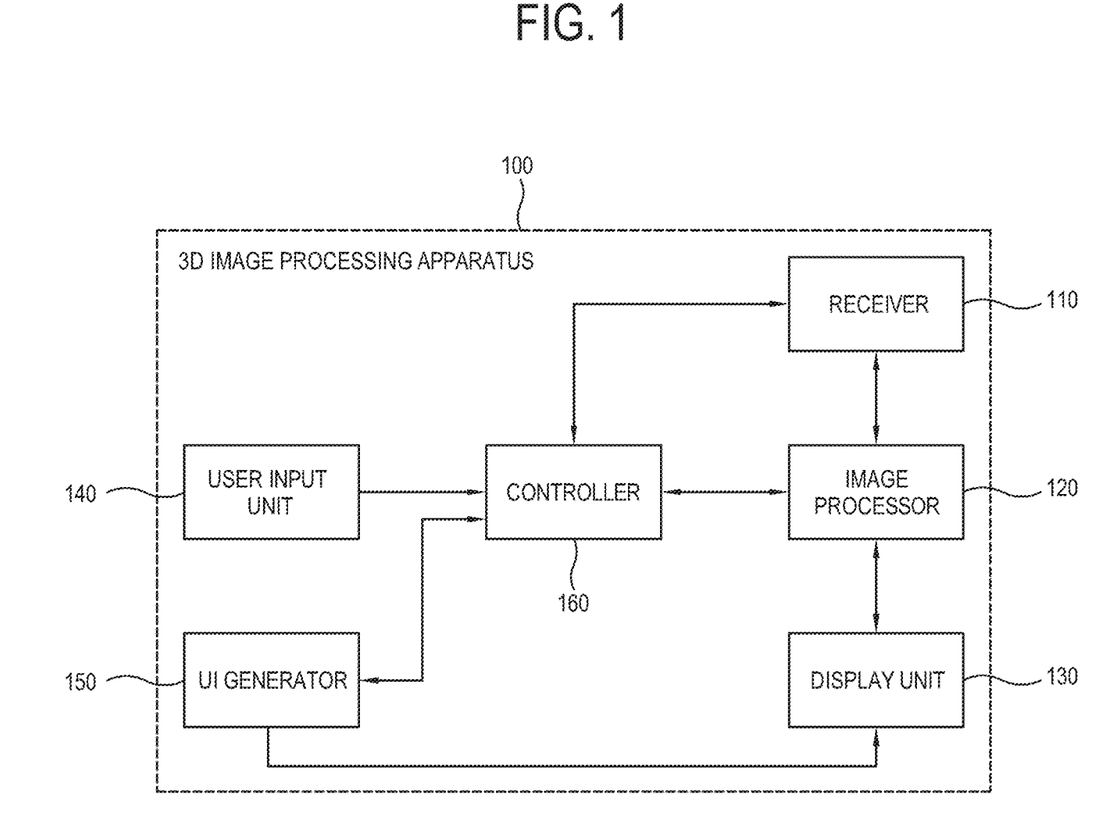
FIG. 1 is a control block diagram of a 3D image processing apparatus according to an exemplary embodiment.

FIG. 1 is a control block diagram of a 3D image processing apparatus according to an exemplary embodiment.

A 3D image processing apparatus 100 may process an input image as a single eye image (i.e., an image seen the same by both left and right eyes) provided by an external source device (not shown) or a storage medium (not shown) into a both eye image (i.e., a different image is seen by the left and right eyes). The single eye image may include a 2D image, such that the terms may be used together. The both eye image includes a 3D image (or stereoscopic image), such that the terms may be used together. The 3D image processing apparatus 100 generates stereoscopic image processing information for an input image, and performs a rendering operation based on the generated stereoscopic image processing information to process the input image into a 3D image.

If the 3D image processing apparatus 100 receives a user's input for selecting an error identification mode during a process of processing an input image including a plurality of frames into a 3D image, it may perform an error identification operation for a part of the plurality of frames having the stereoscopic image processing information. If the error is identified according to the error identification result, the 3D image processing apparatus 100 may display error information on the frame having the error. A user may modify the generated stereoscopic image processing information to correct the error and perform the rendering operation for the input image based on the modified stereoscopic image processing information. Thus, the input image corrects the error when the input image is processed into a stereoscopic image.

As shown in FIG. 1, the 3D image processing apparatus 100 includes a receiver 110, an image processor 120, a display unit 130, a user input unit 140, a user interface (UI) generator 150 and a controller 160. The controller 160 controls the receiver 110, the image processor 120, the display unit 130, and the UI generator 150.

The 3D image processing apparatus 100 may include any type of electronic device which processes an input image (i.e., a single eye image) into a both eye image. Otherwise, the 3D image processing apparatus 100 may also include any electronic device which includes a program to process a single eye image into a both eye image. The electronic device may include a display apparatus, e.g., a personal computer (PC).

The 3D image processing apparatus 100 may receive an input image including a plurality of frames from an external source device (not shown) through the receiver 110. The 3D image processing apparatus 100 may perform data communication with the external source device in a predetermined wired/wireless network. The 3D image processing apparatus 100 may receive an input image including a plurality of frames from an external storage medium (not shown), i.e., a Universal serial bus (USB), compact disc (CD), or blue-ray disc (BD).

A stereoscopic image which is processed from an input image by the 3D image processing apparatus 100 may include a stereoscopic image by a shutter glass or a stereoscopic image by a polarized glass. The shutter glass implements a 3D image by using shutter glasses, in which the display apparatus separately displays left and right images. The left image is provided by a left side glass and the right side image is provided by a right side glass, providing a 3D effect. The polarized glass implements a 3D image by using polarized glasses, in which the display apparatus 100 includes a polarized filter. If a user views an image through polarized glasses in the same polarization method as the polarized filter, a left image is provided for a user's left eye and a right image is provided for the user's right eye, providing a 3D effect. The image processor 110 of the 3D image processing apparatus 100 generates stereoscopic image processing information for an input image, performs a rendering operation based on the generated stereoscopic image processing information, and processes a format of the image into either the shutter glass or the polarized glass to generate a stereoscopic image.

The image processor 120 generates stereoscopic image processing information for an input image including a plurality of frames, performs the rendering operation based on the generated stereoscopic image processing information and processes the input image into a stereoscopic image.

The stereoscopic image processing information includes at least one of key frame information, object extraction information, and depth information. The key frame information includes a scene change frame, a frame where a major object comes out for a first time, and a frame where an object shows a large motion among the plurality of frames. The object extraction information includes selection information of an object to which a depth value is assigned to express a 3D effect for at least one object included in the processed frame. The depth information includes a depth value to express a 3D effect. Accordingly, the image processor 120 selects a key frame among the plurality of frames, extracts an object included in the selected key frame, assigns depth information to the extracted object, and tracks down a non-key frame among the plurality of frames to thereby generate the stereoscopic image processing information. The non-key frame includes the frames not including the key frame. For example, if a scene change frame is selected as a key frame, the non-key frame would be a frame immediately following the key frame to a frame immediately preceding a next scene change frame. The non-key frame may include background and object information, similar to the key frame. According to a tracking process, the object extraction information and depth information assigning information of the key frame may be used to extract an object and assign depth information to the non-key frame.

The image processor 120 may include a predetermined image processing program functioning as the image processor. If the image processor 120 includes a predetermined image processing program, the image processing program is stored in a storage unit (not shown), and the image processing program stored in the storage unit may be loaded to a Random Access Memory (RAM) (not shown) for execution by a control of the controller 160.

The display unit 130 may display a stereoscopic image (i.e., a 3D image) processed by the image processor 120. The display unit 130 may display on the frame the error information according to the error identification result of the controller 160. The display unit 130 displays thereon a UI generated by the UI generator 150. The display unit 130 may include various display unit types, including a liquid crystal, plasma, light-emitting diode, organic light-emitting diode, surface-conduction electron-emitter, carbon nano-tube, and nano-crystal.

The user input unit 140 is a user interface receiving a user's input for selecting a function or operation of the 3D image processing apparatus 100. Accordingly, the 3D image processing apparatus 100 may receive an input for selecting an error identification mode or an input for selecting a UI displayed on the display unit 130 through the user input unit 140. The user input unit 140 may include at least one key button, a manipulation panel, or a touch panel provided in the 3D image processing apparatus 100. The user input unit 140 may also include a pointing device, i.e., a remote controller, keyboard, or mouse connected to the 3D image processing apparatus 100 in a wired/wireless manner.

The UI generator 150 generates a first UI to correct an error by a control of the controller 160. The UI generator 150 generates a second UI to display an error occurrence level by a control of the controller 160. All of the UIs generated by the UI generator 150 may be in the form of a graphic user interface (GUI) and displayed on the display unit 130.

The controller 160 may perform an error identification operation for a part of a plurality of frames forming the input image and having the stereoscopic image processing information, and control the display unit 130 to display the error information on the frame according to the error identification result. If a user selects the error identification mode through the user input unit 140, the controller 160 may perform the error identification operation for part of the plurality of frames having the stereoscopic image processing information until an input timing of the error identification mode. The controller 160 controls the image processor 120 to perform a rendering operation for the error identification for the part of the frames having the stereoscopic image processing information until the input timing, and performs the error identification operation for the rendered stereoscopic image. The operation of the controller 160 will be described in more detail with reference to FIGS. 2 to 4.

Figure 2:
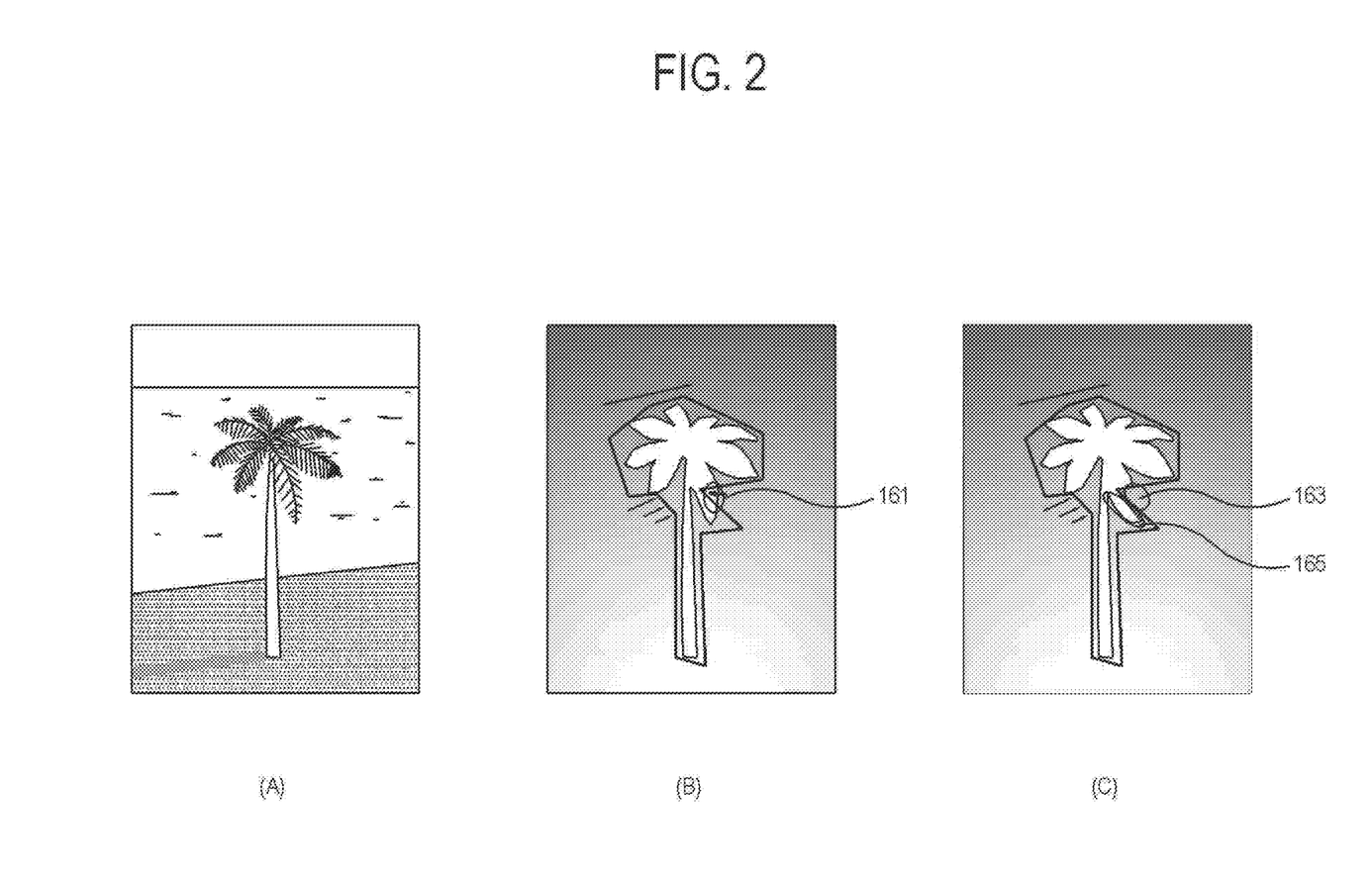
FIG. 2 illustrates an operation of a controller of the 3D image processing apparatus according to the exemplary embodiment.

FIG. 2 illustrates the operation of the controller 160 of the 3D image processing apparatus 100 according to the exemplary embodiment.

The image processor 120 selects a key frame among a plurality of frames forming an input image, extracts an object from the selected key frame, assigns depth information to the extracted object and tracks down non-key frames among the plurality of frames to generate stereoscopic image processing information of the input image.

If the error identification mode is selected through the user input unit 140, the controller 160 performs the error identification operation with respect to the operation result of the image processor 120.

According to an exemplary embodiment of the error identification operation, the controller 160 may determine an error in extracting the object based on a motion vector of the frame for which the error identification operation is performed.

FIG. 2 illustrates an original image (A) of a particular frame among the plurality of frames. FIG. 2 also illustrates a result (B) of a motion vector estimation based on block for a frame having the stereoscopic image processing information corresponding to the original image (A). In other words, the controller 160 estimates a motion vector based on a block for a frame for which the error identification operation is performed. Thus, the controller 160 determines the error in extracting the object. As per the result (B) in FIG. 2, the controller 160 determines that an error has occurred in extracting an object of a particular area (first area 161) if it determines that the motion vector of the first area 161 has a different direction from that of a motion vector of other areas. In this case, the controller 160 may display the motion vector of the first area 161, in which the error has occurred in the frame, in bold, highlight, or display the motion vector in a different color for the user's identification.

According to another exemplary embodiment of the error identification operation, the controller 160 may determine an error in assigning the depth information on the basis of a depth map of the frame for which the error identification operation is performed.

FIG. 2 illustrates a depth map (C) for a frame having stereoscopic image processing information corresponding to the original image (A). The depth map (C) expresses a depth value applying to the frame, and is displayed in black and white depending on the depth value. A negative (−) depth value is displayed in white and a positive (+) depth value is displayed in black. Thus, the size of the depth value is expressed by the depth of color.

When comparing with the original image (A), a second area 163 in the depth map of (C) in FIG. 2 is assigned with a positive (+) depth value even though it should be assigned with a negative (−) depth value. A third area 165 is assigned with a negative (−) depth value even though it should be assigned with a positive (+) depth value. As such, the controller 160 may determine an error in assigning the depth information on the basis of the depth map, and indicate the area having the error to be identified by a user (i.e., designation of area, or indication of the designated area in color or highlight).

According to another exemplary embodiment of the error identification operation, the controller 160 may determine an error in selecting a key frame corresponding to non-key frames based on an error occurrence frequency in extracting the object or assigning the depth information for the non-key frames among the plurality of frames. As described above, the image processor 120 tracks down at least one non-key frame, and extracts an object and assigns depth information. Accordingly, if the frame in which the error has occurred in extracting the object or assigning the depth information is the non-key frame and the number of the non-key frames having the error is at least a predetermined number, the controller 160 may determine that the error has occurred in selecting the key frame corresponding to the non-key frame. In this case, the controller 160 may indicate in at least one non-key frame that the error has occurred in selecting the key frame. The error in selecting the key frame can be identified by the user.

Figure 3:
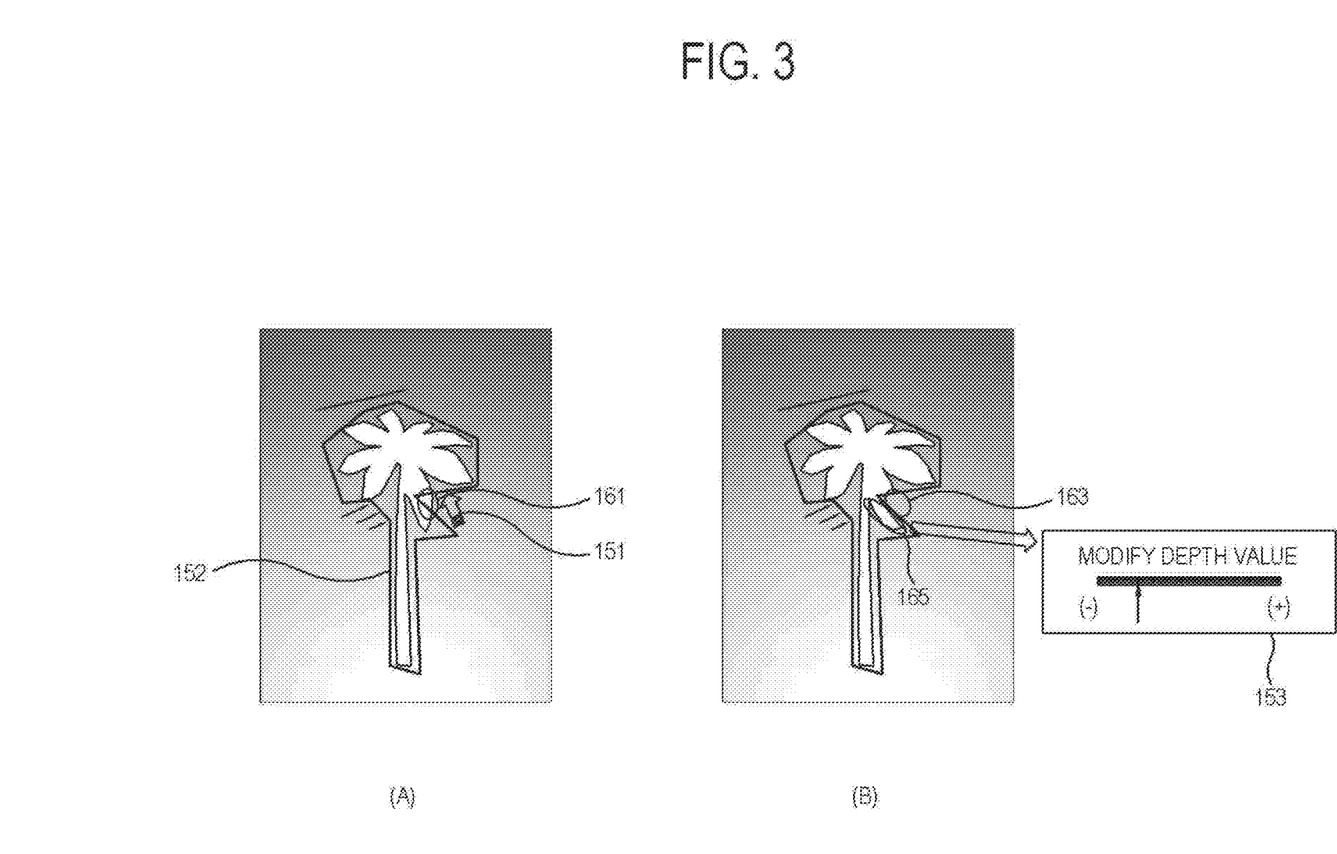
FIG. 3 illustrates another operation of the controller of the 3D image processing apparatus according to the exemplary embodiment.

FIG. 3 illustrates another operation of the controller 160 of the 3D image processing apparatus 100 according to the exemplary embodiment.

If it is identified that the error has occurred according to the error identification result, the controller 160 controls the UI generator 150 to generate and display a first UI to correct the error. If the error correction mode is selected through the user input unit 140 for the frame displaying the error, the controller 160 controls the UI generator 150 to generate and display the first UI. The first UI includes at least one of a first sub UI to correct the error in extracting the object, a second sub UI to reassign the depth information, and a third sub UI to reselect the key frame.

The controller 160 generates and displays the first UI to correct the error on the frame. The error on the frame may include the areas 161, 163 and 165.

In the case of (A) in FIG. 3, the first sub UI is generated by a control of the controller 160. In the case of (B) in FIG. 2, the controller 160 may control the UI generator 150 to generate and display a first sub UI 151 to correct the error in extracting the object with respect to the first area 161. The first area 161 is identified to have the error in extracting the object. The first sub UI 151 is an interface which enables a user to modify a boundary line 152 to extract the object through the user input unit 140, i.e., a pointing device. Thus, a user may properly modify the boundary line 152 through the first sub UI 151 to extract the object.

In the case of (B) in FIG. 3, the second sub UI is generated by a control of the controller 160. In the depth map (C) of FIG. 2, the controller 160 may control the UI generator 150 to generate and display a second sub UI to reassign the depth information with respect to the second and third areas 163 and 165 which are identified to have the error in assigning the depth information. For example, if the user selects the third area 165 through the user input unit 140, the second sub UI 153 is generated and displayed. The second sub UI 153 is provided as a slide bar to adjust the depth value so that the user may adjust the depth value to a desired value. According to the present exemplary embodiment, the second sub UI 153 is provided as a slide bar, but it may be provided in the form of a UI for a user to input a particular figure. The second sub UI 153 may also include any type of UI to receive the user's selection.

If the user's selection is input through the first UI, the controller 160 may control the image processor 120 to modify the stereoscopic image processing information based on the user's selection and render the input image based on the modified stereoscopic image processing information. Embodiments enable a user to review feasibility in generating the stereoscopic image processing information in the error identification mode in the course of processing the input image into a stereoscopic image, modify the stereoscopic image processing information in the modification mode, and provide the stereoscopic image reflecting the modification.

Figure 4:
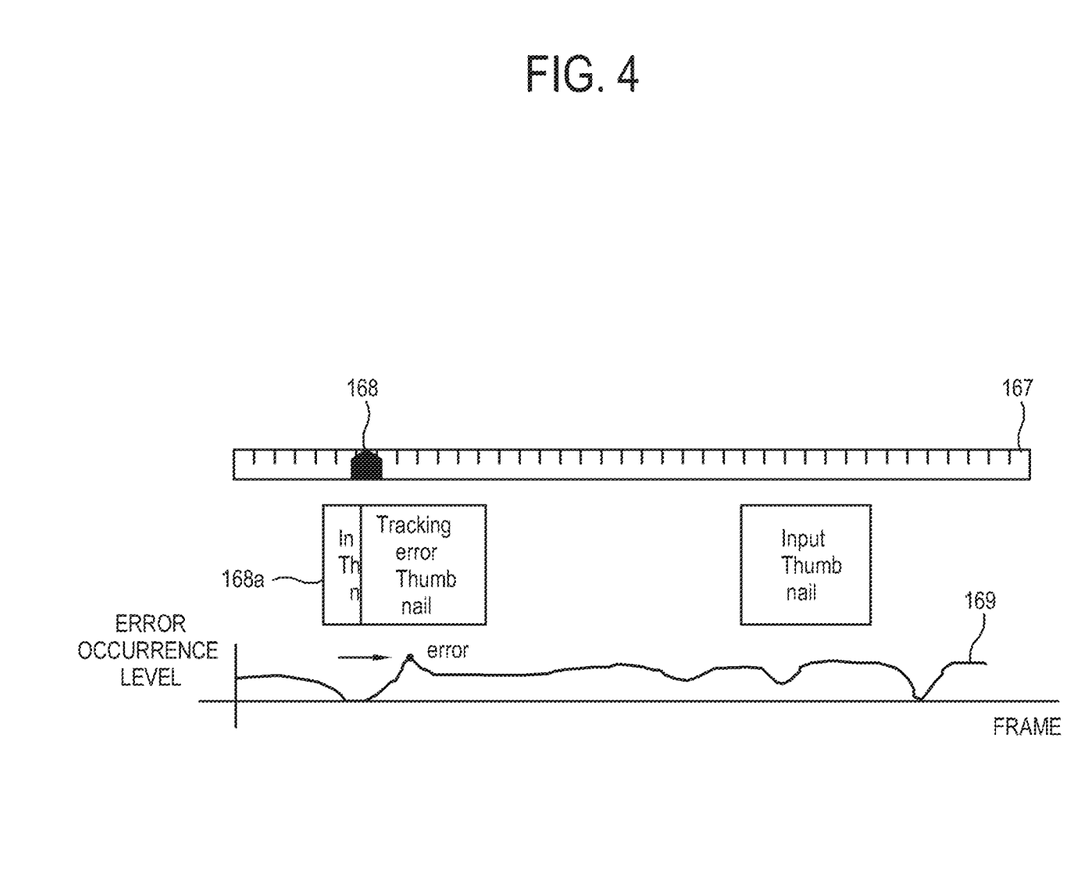
FIG. 4 illustrates another operation of the controller of the 3D image processing apparatus according to the exemplary embodiment.

FIG. 4 illustrates another operation of the controller 160 of the 3D image processing apparatus 100 according to the exemplary embodiment.

The controller 160 may determine an error occurrence level for the plurality of frames, and control the UI generator 150 to generate and display a second UI to display the determined level. This enables a user to identify the possibility of occurrence of error for the plurality of frames. Also, this allows a user to perform the error identification operation for only a frame which is determined to have a high possibility for error.

The controller 160 may determine the error occurrence level based on a complexity of the object included in the plurality of frames or the amount of motion of the object. If the object is complex or has large amounts of motion, there is a high possibility of an error occurrence in extracting the object. If the error is very likely to occur in extracting the object, there is also a high possibility of an error occurrence in assigning the depth value to the extracted object. Accordingly, upon receiving a particular key input from the user input unit 140, the controller 160 determines the error occurrence level for the plurality of frames and controls the UI generator 150 to generate and display the second UI to display the determination result.

FIG. 4 illustrates the implementation of the second UI. A predetermined bar 167 represents a zone of the plurality of frames and displays a first frame to the Nth frame forming the plurality of frames. An arrow 168 is provided to freely move back and forth on the bar 167, and the movement of the arrow 168 may navigate the plurality of frames. If one frame is selected by the movement of the arrow 168, a thumbnail image 168a in the frame is displayed. A graph 169 illustrates the determination result of the error occurrence level by the controller 160. The user may identify which frame is very likely to have an error.

The controller 160 may perform the error identification operation for at least one frame which is identified to have at least a predetermined level of the error occurrence.

Figure 5:
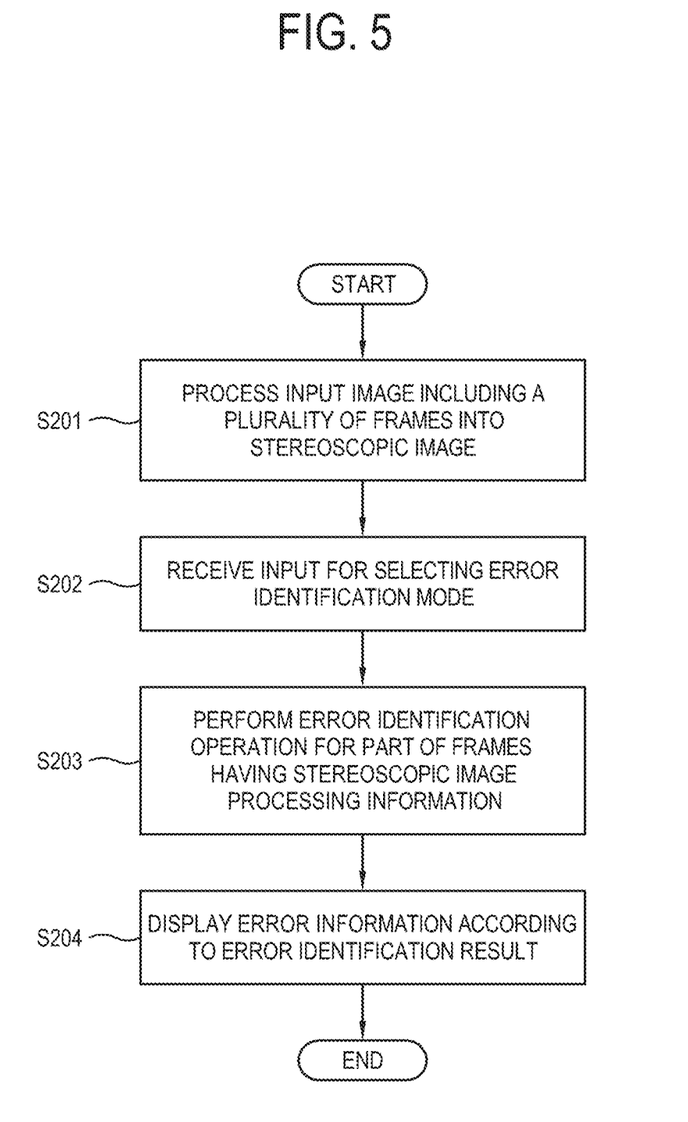
FIGS. 5 and 6 are flowcharts of an implementation method of the 3D image processing apparatus.
Figure 6:
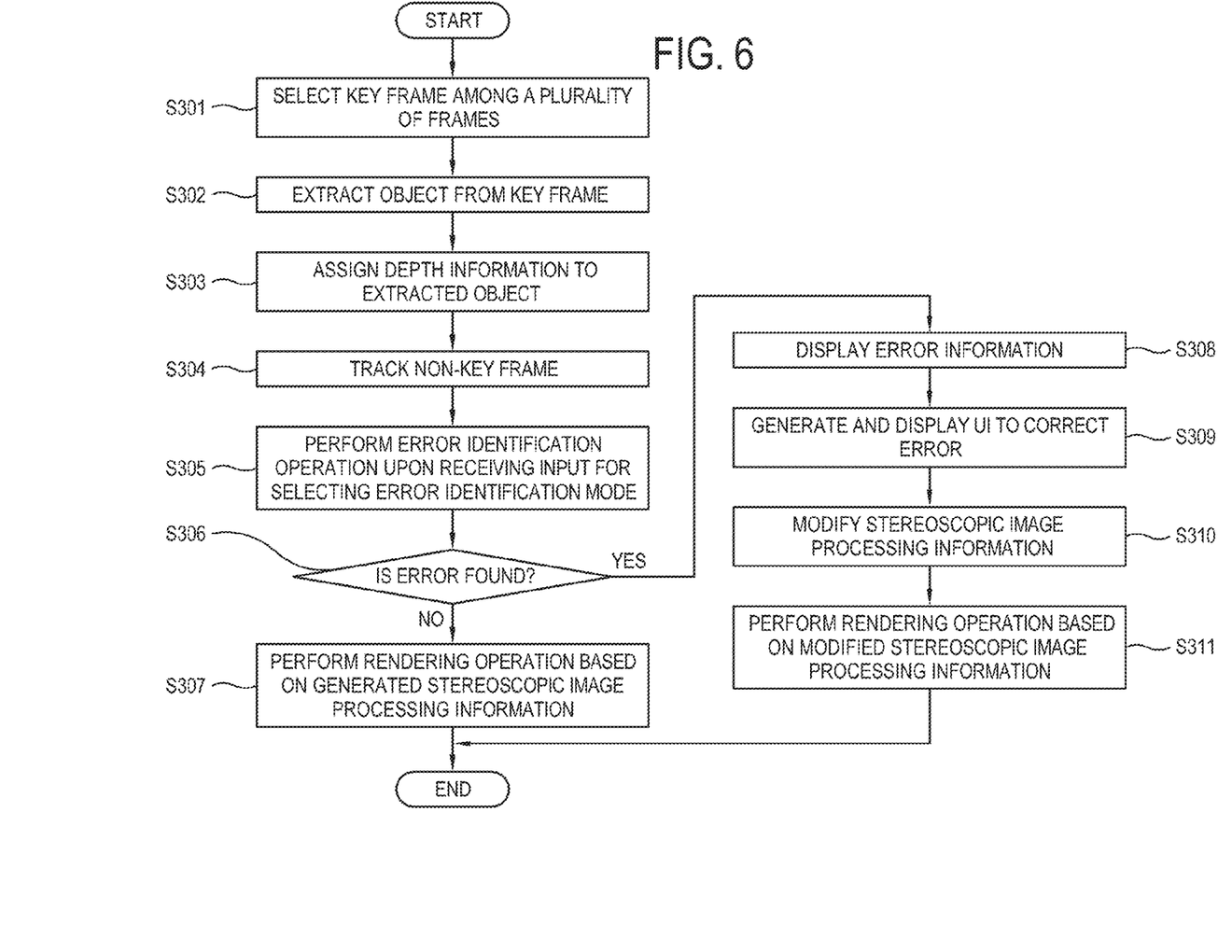

FIGS. 5 and 6 are flowcharts of an implementation method of the 3D image processing apparatus.

As shown in FIG. 5, the implementation method includes a step of processing an input image including the plurality of frames into a stereoscopic image (S201), a step of receiving an input for selecting the error identification mode (S202), a step of performing the error identification operation for a part of the plurality of frames having the stereoscopic image processing information (S203), and a step of displaying error information according to the error identification result (S204).

FIG. 6 is a flowchart of a detailed implementation method. As shown in FIG. 6, the image processor 120 selects the key frame among the plurality of frames for the input image (S301), extracts the object for the key frame (S302), assigns the depth information to the extracted object (S303), tracks down the remaining frames (non-key frames) (S304), and perform the error identification operation for the part of the frames having the stereoscopic image processing information until the input timing, upon receiving an input for selecting the error identification mode (S305). According to the error identification result (S304), if no error has been identified, the image processor 140 perform the rendering operation based on the generated stereoscopic image processing information to complete the processing of the input image into the stereoscopic image (S307). If the error has been identified, the error information is displayed on the frame (S308). If an input of the error correction mode is received, the controller 160 controls the UI generator 150 to generate and display the UI to correct the error (S309), and modifies the stereoscopic image processing information through the UI (S301). The image processor 120 performs the rendering operation based on the modified stereoscopic image processing information to complete the processing of the input image into the stereoscopic image (S311).

The implementation method of the 3D image processing apparatus may be implemented in a program command to be executed through various computer means and recorded in a computer-readable storage medium. The computer-readable storage medium may include a program command, a data file, a data configuration, etc. The program command recorded in the storage medium may be specially designed and configured for exemplary embodiments, or may be known to those skilled in computer software. For example, the computer-readable recording medium may include a hard disk, floppy disk, magnetic media such as a magnetic tape, optical media such as CD-ROM or DVD, a magneto-optical media such as a floptical disk, or a hardware device configured to store and execute a program command, i.e., Read-Only Memory (ROM), RAM. The program command may include a machine language made by a compiler and an advanced language code to be executed by a computer by an interpreter. The hardware device may be configured to operate as at least one software module to perform the operation.

As described above, a 3D image processing apparatus, an implementation method thereof and a computer-readable storage medium thereof according to exemplary embodiments performs an error identification operation for a 3D image generated corresponding to a part of a plurality of frames or a 2D image and corrects the error when the 2D image is processed into a 3D image.

Although a few exemplary embodiments have been shown and described, it will be appreciated by those skilled in the art that changes may be made in these exemplary embodiments without departing from the principles and spirit of exemplary embodiments, the range of which is defined in the appended claims and their equivalents.

What is claimed is:

1. A three-dimensional (3D) image processing apparatus comprising:
    an image processor configured to generate stereoscopic image processing information from an input image comprising a plurality of frames;
    a controller configured to perform an error identification operation for a part of the plurality of frames having the stereoscopic image processing information; and
    a display unit,
    wherein the display unit is configured to, in response to an error being identified, display error information for the par of the plurality of frames according to a result of the error identification operation performed by the controller.
    wherein the image processor is further configured to, in response to an error not being identified, perform a rendering operation based on the generated stereoscopic image processing information to process the input image into a stereoscopic image,
    wherein the display unit is further configured to display the stereoscopic image processed by the image processor, and
    wherein the image processor is further configured to select a key frame among the plurality of frames, extract an object comprised in the selected key frame, assign depth information to the extracted object, and track down a non-key frame among the plurality of frames to generate the stereoscopic image processing information.

2. The 3D image processing apparatus according to claim 1, wherein the controller is further configured to determine an error in extracting the object based on a motion vector of the part of the plurality of frames for which the error identification operation is performed.

3. The 3D image processing apparatus according to claim 1, wherein the controller is further configured to determine an error in assigning the depth information based on a depth map of the part of the plurality of frames for which the error identification operation is performed.

4. The 3D image processing apparatus according to claim 1, wherein the controller is further configured to determine an error in selecting the key frame corresponding to the non-key frame based on an error occurrence frequency in extracting the object or assigning the depth information for the non-key frame.

5. A three-dimensional (3D) image processing apparatus comprising:
    an image processor configured to generate stereoscopic image processing information from an input image comprising a plurality of frames;
    a controller configured to perform an error identification operation for a part of the plurality of frames having the stereoscopic image processing information; and
    a display unit,
    wherein the display unit is configured to, in response to an error being identified, display error information for the part of the plurality of frames according to a result of the error identification operation performed by the controller, wherein the image processor is further configured to, in response to an error not being identified, perform a rendering operation based on the generated stereoscopic image processing information to process the input image into a stereoscopic image, wherein the display unit is further configured to display the stereoscopic image processed by the image processor, and wherein the controller is further configured to control the display unit to display a predetermined area having an error on the part of the plurality of frames by using at least one of bold, highlight, and displaying a motion vector in a different color as the error information.

6. A three-dimensional (3D) image processing apparatus comprising:

an image processor configured to generate stereoscopic image processing information from an input image comprising a plurality of frames;

a controller configured to perform an error identification operation for a part of the plurality of frames having the stereoscopic image processing information;

a display unit; and a user interface (UI) generator configured to generate a UI to correct an error, wherein the display unit is configured to, in response to an error being identified, display error information for the part of the plurality of frames according to a result of the error identification operation performed by the controller, wherein the image processor is further configured to, in response to an error not being identified, perform a rendering operation based on the generated stereoscopic image processing information to process the input image into a stereoscopic image, wherein the display unit is further configured to display the stereoscopic image processed by the image processor, and wherein the controller is further configured to control the UI generator to generate and display the generated UI on the part of the plurality of frames where the error is found.

7. The 3D image processing apparatus according to claim 6, further comprising a user input unit, wherein the controller is further configured to control the image processor to modify the stereoscopic image processing information based on a selection input through the UI and to perform a rendering operation for the input image based on the modified stereoscopic image processing information.

8. A three-dimensional (3D) image processing apparatus comprising:

an image processor configured to generate stereoscopic image processing information from an input image comprising a plurality of frames;

a controller configured to perform an error identification operation for a part of the plurality of frames having the stereoscopic image processing information;

a display unit; and a user interface (UI) generator configured to generate a UI to display an error occurrence level, wherein the display unit is configured to, in response to an error being identified, display error info ion for the part of the plurality of frames according to a result of the error identification operation performed by the controller, wherein the image processor is further configured to, in response to an error not being identified, perform a rendering operation based on the generated stereoscopic image processing information to process the input image into a stereoscopic image, wherein the display unit is further configured to display the stereoscopic image processed by the image processor, and wherein the controller is further configured to determine an error occurrence level for the plurality of frames, and to control the UI generator to generate and display the UI to display the determined error occurrence level.

9. The 3D image processing apparatus according to claim 8, wherein the controller is further configured to determine the error occurrence level based on a complexity of an object comprised in the plurality of frames or an amount of motion of the object.

10. A three-dimensional (3D) image processing apparatus comprising:

an image processor configured to generate stereoscopic image processing information from an input image comprising a plurality of frames;

a controller configured to perform an error identification operation for a part of the plurality of frames having the stereoscopic image processing information;

a display unit; and a user input unit, wherein the display unit is configured to, in response to an error being identified, display error information for the part of the plurality of frames according to a result of the error identification operation performed by the controller, wherein the image processor is further configured to, in response to an error not being Identified, perform a rendering operation based on the generated stereoscopic image processing information to process the input image into a stereoscopic image, wherein the display unit is further configured to display the stereoscopic image processed by the image processor, and wherein the controller is further configured to perform the error identification operation for the part of the plurality of frames having the stereoscopic image processing information until an input timing of an error identification mode selected through the user input unit.

11. An implementation method of a three-dimensional (3D) image processing apparatus comprising:

generating stereoscopic image processing information of an input image comprising a plurality of frames processing information to process the input image into a stereoscopic image;

performing an error identification operation for a part of the plurality of frames having the stereoscopic image processing information;

displaying, in response to an error being identified, error information for the part of the plurality of frames according to a result of the error identification operation;

performing, in response to an error not being identified, a rendering operation based on the generated stereoscopic image processing information to process the input image into a stereoscopic image; and displaying the stereoscopic image, wherein the generating the stereoscopic image processing information comprises:

selecting a key frame among the plurality of frames;
extracting an object comprised in the selected key frame;
assigning depth information to the extracted object; and
performing a tracking operation for a non-key frame among the plurality of frames.

12. The implementation method according to claim 11, wherein the performing the error identification operation comprises determining an error in extracting the object based on a motion vector of the part of the plurality of frames for which the error identification operation is performed.

13. The implementation method according to claim 11, wherein the performing the error identification operation comprises determining an error in assigning the depth information based on a depth map of the part of the plurality of frames for which the error identification operation is performed.

14. The implementation method according to claim 11, wherein the performing the error identification operation comprises determining an error in selecting the key frame corresponding to the non-key frame based on an error occurrence frequency in extracting the object or assigning the depth information for the non-key frame.

15. An implementation method of a three-dimensional (3D) image processing apparatus comprising:
generating stereoscopic image processing information of an input image comprising a plurality of frames processing information to process the input image into a stereoscopic image;
performing an error identification operation for a part of the plurality of frames having the stereoscopic image processing information;
displaying, in response to an error being identified, error information for the part of the plurality of frames according to a result of the error identification operation;
performing, in response to an error not being identified, a rendering operation based on the generated stereoscopic image processing information to process the input image into a stereoscopic image; and
displaying the stereoscopic image,
wherein the displaying the error information comprises displaying a predetermined area having an error on the part of the plurality of frames by using at least one of bold, highlight, and displaying a motion vector in a different color as the error information.

16. An implementation method of a three-dimensional (3D) image processing apparatus comprising:
generating stereoscopic image processing information of an input image comprising a plurality of frames processing information to process the input image into a stereoscopic image;
performing an error identification operation for a part of the plurality of frames having the stereoscopic image processing information;
displaying, in response to an error being identified, error information for the part of the plurality of frames according to a result of the error identification operation;
performing, in response to an error not being identified, a rendering operation based on the generated stereoscopic image processing information to process the input image into a stereoscopic image;
displaying the stereoscopic image; and
generating and displaying a user interface (UI) on the part of the plurality of frames having an error.

17. The implementation method according to claim 16, further comprising modifying the stereoscopic image processing information based on a selection input through the UI; and
rendering the input image based on the modified stereoscopic image processing information.

18. An implementation method of a three-dimensional (3D) image processing apparatus comprising:
generating stereoscopic image processing information of an input image comprising a plurality of frames processing information to process the input image into a stereoscopic image;
performing an error identification operation for a part of the plurality of frames having the stereoscopic image processing information;
displaying, in response to an error being identified, error information for the part of the plurality of frames according to a result of the error identification operation;
performing, in response to an error not being identified, a rendering operation based on the generated stereoscopic image processing information to process the input image into a stereoscopic image;
displaying the stereoscopic image;
determining an error occurrence level for the plurality of frames; and
generating and displaying a UI to display the determined error occurrence level.

19. The implementation method according to claim 18, wherein the determining comprises determining the error occurrence level based on a complexity of an object comprised in the plurality of frames or an amount of motion of the object.

20. An implementation method of a three-dimensional (3D) image processing apparatus comprising:
generating stereoscopic image processing information of an input image comprising a plurality of frames processing information to process the input image into a stereoscopic image;
performing an error identification operation for a part of the plurality of frames having the stereoscopic image processing information;
displaying, in response to an error being identified, error information for the part of the plurality of frames according to a result of the error identification operation;
performing, in response to an error not being identified, a rendering operation based on the generated stereoscopic image processing information to process the input image into a stereoscopic image; and
displaying the stereoscopic image,
wherein the performing the error identification operation comprises performing the error identification operation for the part of the plurality of frames having the stereoscopic image processing information until an input timing of an error identification mode.

* * * * *